US010404716B2

(12) United States Patent
Walstad et al.

(10) Patent No.: US 10,404,716 B2
(45) Date of Patent: Sep. 3, 2019

(54) DATA CLASSIFICATION AND ACCESS CONTROL FOR CLOUD BASED DATA

(71) Applicant: Microsoft Technology Licensing, LLC, Redmond, WA (US)

(72) Inventors: Christopher Leonard Walstad, Seattle, WA (US); Vishal Agarwal, Kirkland, WA (US); Narendra S. Acharya, Kirkland, WA (US); Octavian T. Ureche, Bellevue, WA (US); Preston Derek Adam, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 117 days.

(21) Appl. No.: 15/460,101

(22) Filed: Mar. 15, 2017

(65) Prior Publication Data
US 2018/0234430 A1  Aug. 16, 2018

Related U.S. Application Data

(60) Provisional application No. 62/458,468, filed on Feb. 13, 2017.

(51) Int. Cl.
*G06F 17/00* (2019.01)
*H04L 29/06* (2006.01)

(52) U.S. Cl.
CPC .......... *H04L 63/105* (2013.01); *H04L 63/083* (2013.01); *H04L 63/0815* (2013.01)

(58) Field of Classification Search
CPC .. H04L 63/105; H04L 63/0815; H04L 63/083
See application file for complete search history.

(56) References Cited

U.S. PATENT DOCUMENTS

| 8,566,578 | B1 | 10/2013 | Banerjee |
| 8,832,848 | B1 | 9/2014 | Banerjee |
| 8,950,009 | B2 | 2/2015 | Vijayan et al. |
| 9,407,664 | B1 | 8/2016 | Banerjee |
| 2006/0191017 | A1* | 8/2006 | Hieda ................. G06F 21/6218 726/27 |

(Continued)

OTHER PUBLICATIONS

Plastina, Dan, "Azure Information Protection: Available in Public Preview Now!", https://blogs.technet.microsoft.com/enterprisemobility/2016/07/12/azure-information-protection-public-preview-available-now/, Published on: Jul. 12, 2016, 8 pages.

(Continued)

*Primary Examiner* — Trong H Nguyen
*Assistant Examiner* — Amie C. Lin
(74) *Attorney, Agent, or Firm* — Workman Nydegger

(57) ABSTRACT

A data protection policy can specify which applications are allowed and/or dis-allowed from accessing cloud data that is subject to a data protection policy (i.e., data that has been assigned a classification and/or an owner.) To enforce that policy, the operating system (or other trusted entity) that stores or caches access credentials only provides these credentials to applications that are allowed by the policy. In this manner, because they are not provided with the credentials required to access the network resource, the dis-allowed applications cannot access the 'protected' data thereby helping prevent these dis-allowed (or noncompliant) applications from leaking data.

19 Claims, 8 Drawing Sheets

(56) References Cited

U.S. PATENT DOCUMENTS

| | | | | |
|---|---|---|---|---|
| 2007/0289001 | A1* | 12/2007 | Havercan | G06F 21/33 726/6 |
| 2013/0054803 | A1* | 2/2013 | Shepard | H04L 63/0884 709/225 |
| 2014/0325600 | A1 | 10/2014 | Odenheimer | |
| 2016/0021097 | A1* | 1/2016 | Shrotri | H04L 63/0815 726/8 |

OTHER PUBLICATIONS

Vengurlekar, et al., "Security in Private Database Clouds", In White Paper of Oracle, Jul. 2012, pp. 1-14.

Agrawal, Amit, "How a CASB Enables Cloud Data Classification at Scale", https://www.skyhighnetworks.com/cloud-security-blog/how-a-casb-enables-cloud-data-classification-at-scale/, Retrieved on: Dec. 22, 2016, 7 pages.

"Collaborate Securely in the Cloud with Data Classification", http://www.titus.com/solutions-cloud-data-security.php, Published on: Mar. 2014, 5 pages.

McNulty, Chris, "Enhanced Conditional Access Controls, Encryption Controls and Site Classification in Sharepoint and Onedrive", https://blogs.office.com/2016/09/26/enhanced-conditional-access-controls-encryption-controls-and-site-classification-in-sharepoint-and-onedrive/, Published on: Sep. 26, 2016, 7 pages.

Puleo, Jill, "Use Data Classification to Protect Sensitive Data in Google Drive", https://www.cloudlock.com/blog/use-data-classification-to-protect-sensitive-data-in-google-drive/, Published on: Feb. 26, 2014, 3 pages.

"Prevent Data from Leaking out of Your Organization", http://www.mcafee.com/in/resources/solution-briefs/sb-quarterly-threats-sep-2016-2.pdf, Retrieved on: Dec. 22, 2016, 4 pages.

"Azure Information Protection ", http://web.archive.org/web/20161103220228/http:/download.microsoft.com/download/8/E/A/8EADA071-28E0-4456-BC2D-6826B959A7E0/Azure_Information_Protection_datasheet_EN-US.pdf, Nov. 3, 2016, 4 pages.

* cited by examiner

DATA CLASSIFICATION AND ACCESS CONTROL FOR CLOUD BASED DATA

BACKGROUND

Data leakage can be defined as the unauthorized and/or uncontrolled transfer of sensitive or secret information from a computer to the outside world. Many employees admit to leaking data to unmanaged personal locations. These leaks can occur, for example, when a personal email account is used to send or receive business data. In another example, an employee may copy business data to their personal cloud storage account. In a mobile and cloud environment, this data leakage problem is even more complex as sensitive data may no longer reside on a few, easily controlled and managed corporate servers.

SUMMARY

Examples discussed herein relate to a method implemented in a computing device that includes determining that first data from a network resource is subject to a data protection policy where the network resource requires access credentials to access the first data. It is determined that a first process implements the data protection policy. Based at least in part on the first process implementing the data protection policy, the first process is provided with the access credentials required to access the first data. The method also includes determining that a second process does not implement the data protection policy. Based at least in part on the second process not implementing the data protection policy, the second process is denied the access credentials required to access the first data.

In an example, a user device for accessing a resource from a service endpoint, includes a client component configured to receive an access credential and to receive a data protection policy from a policy management service. The client component is configured to provide the access credential to applications requesting access to a resource. The user device also includes a first application configured to use the access credential to access the resource. Based on the data protection policy, the first application is to be provided the access credential. The user device also includes a second application configured to use the access credential to access the resource. This second application is to, based on the data protection policy, be denied the access credential.

In an example, a computing device includes an operating system configured to receive a data protection policy, to store a first access credential to be used to access a first network resource, and to store a second access credential to be used to access a second network resource. The device also includes a first application that is configured to request the operating system to use the first access credential to allow the first application access to the first network resource. The operating system provides the first application with access to the first network resource based on the data protection policy. The device also includes a second application that is configured to request the operating system to use the first access credential to allow the second application access to the first network resource. However, the operating system, based on the data protection policy, denies the second application access to the first network resource.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION OF THE EMBODIMENTS

Figure 1A:
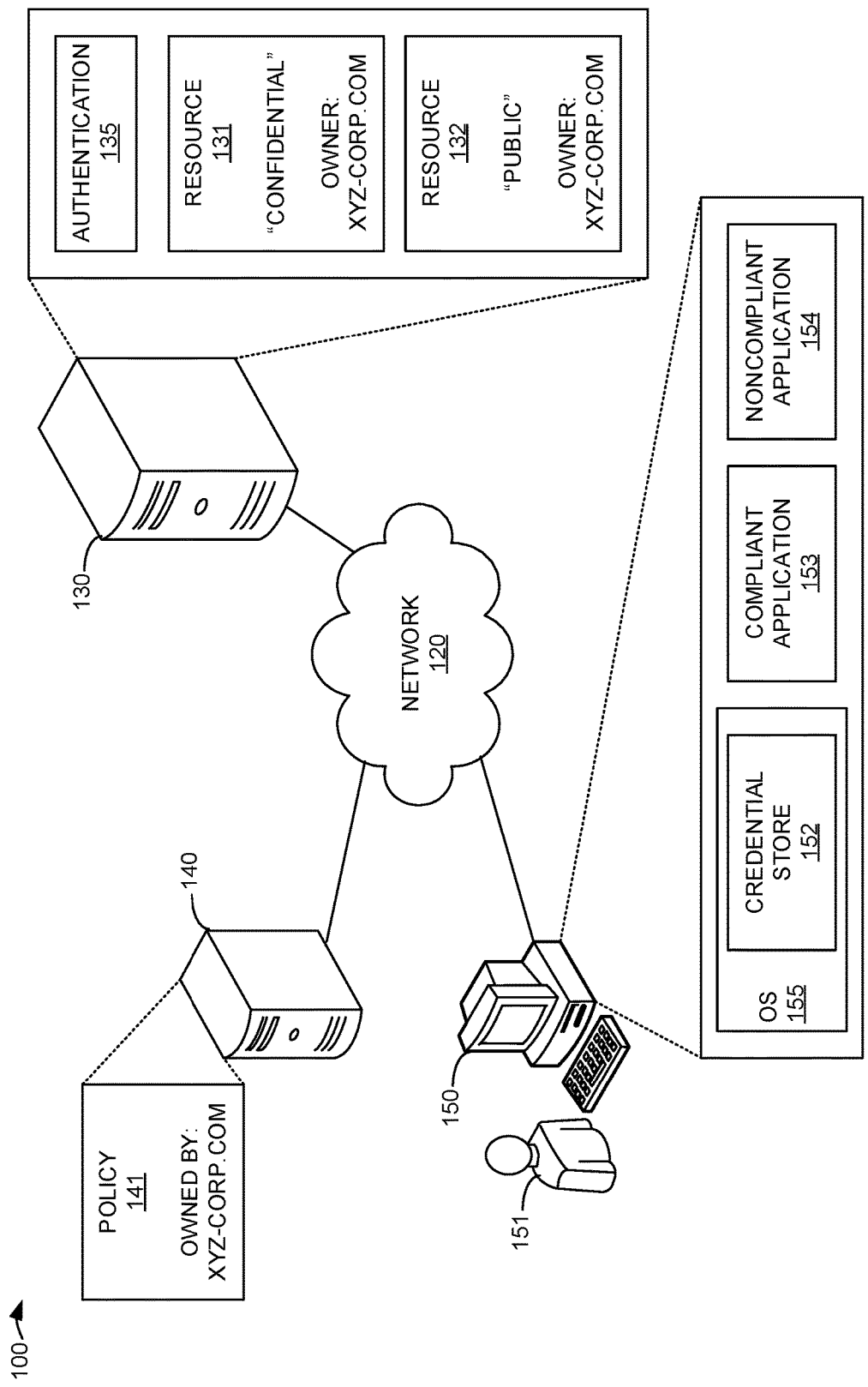
FIGS. 1A-1D are block diagrams and illustrate the operation of a classification and access control system.

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, or a tangible computer readable medium.

Some applications access and allow the transfer of data (e.g., files) regardless of whether that data is subject to a data protection policy. For example, an application that is unaware that data hosted by a network resource (e.g., cloud storage, website, file server, etc.) has been marked 'confidential' or 'for internal use only' may allow that data to be freely copied to insecure and/or outside locations. In an embodiment, a data protection policy can specify which applications are allowed and/or dis-allowed from accessing cloud data that is subject to a data protection policy (i.e., data that has been assigned a classification and/or an owner.) To enforce that policy, the operating system (or other trusted entity) stores or caches access credentials but only provides these credentials to applications that are allowed by the policy. In this manner, because they are not provided with the credentials required to access the network resource, the dis-allowed applications cannot access the 'protected' data thereby helping prevent these dis-allowed (or noncompliant) applications from leaking data.

FIGS. 1A-1D are block diagrams and illustrate the operation of a classification and access control system. In FIGS. 1A-1D, classification and access control system 100 comprises policy server 140, network resource server 130, network 120, client device 150, and user 151. Policy server 140 stores and/or distributes an access policy 141. Network resource server 130 provides access to network resources 131-132 via network 120. Resource server 130 includes an authentication component 135 that receives and evaluates credentials before providing access to one or more of resources 131-132.

Network 120 is a wide area communication network that can provide wired and/or wireless communication between policy server 140, network resource server 130, and client device 150. Network 120 and can comprise wired and/or wireless communication networks that include processing nodes, routers, gateways, physical and/or wireless data links for carrying data among various network elements, including combinations thereof, and can include a local area network, a wide area network, and an internetwork (including the Internet). Network 120 can also comprise wireless networks, including base station, wireless communication nodes, telephony switches, interne routers, network gateways, computer systems, communication links, or some other type of communication equipment, and combinations thereof. Wired network protocols that may be utilized by network 120 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Links between elements of network 120, can be, for example, twisted pair cable, coaxial cable or fiber optic cable, or combinations thereof.

Other network elements may be present in network 120 to facilitate communication but are omitted for clarity, such as base stations, base station controllers, gateways, mobile switching centers, dispatch application processors, and location registers such as a home location register or visitor location register. Furthermore, other network elements may be present to facilitate communication between among elements of access control system 100 which are omitted for clarity, including additional computing devices, client devices, access nodes, routers, gateways, and physical and/or wireless data links for carrying data among the various network elements.

Client device 150 may be, for example, a desktop computer, a tablet computer, a laptop computer, a mobile phone, a wireless phone, a personal digital assistant (PDA), a voice over internet protocol (VoIP) phone, a voice over packet (VOP) phone, or a soft phone, as well as other types of devices or systems that execute applications that access network resources 131-132. Other types of communication platforms are possible. An example device that may be, comprise, and/or include a client device 150 include, but are not limited to, example computer system 500 (described herein with reference to FIG. 5).

In an embodiment, network resources 131-132 provided by resources server 130 may be associated with a data classification that specifies how the data from the network resource 131-132 should be handled. For example, a "confidential" classification may mean the data from resource 131 should not be shared outside the company owning/providing the network resource 131 (e.g. XYZ-Corp.com). In another example, a "public" classification may mean the data from resource 132 should not be subject to a data protection policy.

Policy server 140 stores and/or distributes data protection policy 141 to client device(s) 150 (and OS 155, in particular) so that client device 150 may enforce the restrictions provided by the policy 141. For example, policy 141 may specify that data associated with a particular owner or domain (e.g., XYZ-Corp.com) that is also classified "confidential" may not be copied or otherwise shared with "insecure" and/or "data leaky" applications.

Client device 150 (and thus user 151) is operatively coupled to network 120. Network resources server 130 is operative coupled to network 120. Policy server 140 is operative coupled to network 120. Thus, applications running on client device 150 may access network resources on network resource server 130 via network 120. Likewise, an operating system or other trusted entity may access or receive a data protection policy 141 from policy server 140.

Client device 150 includes operating system (OS) 155, compliant application 153, and noncompliant application 154. OS 155 includes credential store 152. Noncompliant application 154 is an application that has been designated by policy 141 as being 'unsafe' to receive data according to policy 141. Similarly, in an embodiment, all applications may be designated as 'unsafe' by default unless otherwise indicated by policy 141. In this case, noncompliant application 154 is an application that has not had this default overridden by policy 141 as being 'safe' to receive data according to policy 141.

Compliant application 153 is an application that has been designated by policy 141 as being 'safe' to receive data according to policy 141. Thus, for example, compliant application 153 may also receive policy 141. In response to policy 141, compliant application 153 may be designed and implemented such that compliant application 153 will not allow data received from resource 131 that has a particular classification(s) (e.g., "confidential") to be provided to any noncompliant applications 154, or to perform other 'leaky' actions that may allow resource 131 to be shared outside of designated (by policy 141) locations (e.g., outside of the domain XYZ-corp.com). In addition, compliant application 153 may prevent user 151 from copying resource 131 data to the clipboard. In another example, compliant application 153 may prevent user 151 from taking a screenshot of data that compliant application 153 is displaying. Compliant application 153 may cooperate with operating system 155 to prevent these example data leaks.

An issue with noncompliant application 154 is that noncompliant application 154 may be able to access confidential resource 131 and thereby allow confidential resource 131 to be shared outside the parameters set by policy 141. For example, if noncompliant application 154 is a web browser, and resource 131 is a website, noncompliant application 154 may be able to access resource 131 by providing valid access credentials to authentication component 135.

When a user or service wants to access a network computing resource (e.g., resource 131 and/or resource 132), information that proves their identity must typically be provided (e.g., to authentication component 135). The identity is typically in the form of an account's user name. To prove the identity, the user or service typically provides secret information, which is often called the authenticator. An authenticator can take various forms depending on the authentication protocol and method. The combination of an identity and an authenticator is often called an authentication credential.

The process of creating, submitting, and verifying credentials is described simply as authentication, which is implemented through various authentication protocols, such as the Kerberos protocol. Authentication typically establishes the identity of the user.

In an embodiment, OS 155 stores (or caches) the credentials required by authentication component 135 to access confidential resource 131 and public resource 132. OS 155 also receives policy 141. Policy 141 indicates to OS 155 that compliant application 153 should be allowed to access confidential resource 131. Policy 141 indicates to OS 155 that noncompliant application 154 should not be allowed access to confidential resource 131. In response to policy 141, OS 155 uses the credential to provide compliant application 153 with access to confidential resource 131.

Also in response to policy 141, OS 155 configures itself to prevent noncompliant application 154 from using the credential required to access confidential resource 131. Accordingly, because noncompliant application 154 cannot use the credential necessary to access confidential resource 131, noncompliant application 154 is unable to access confidential resource 131, thereby preventing noncompliant application 154 from allowing the leakage of all or portions of resource 131.

Figure 1B:
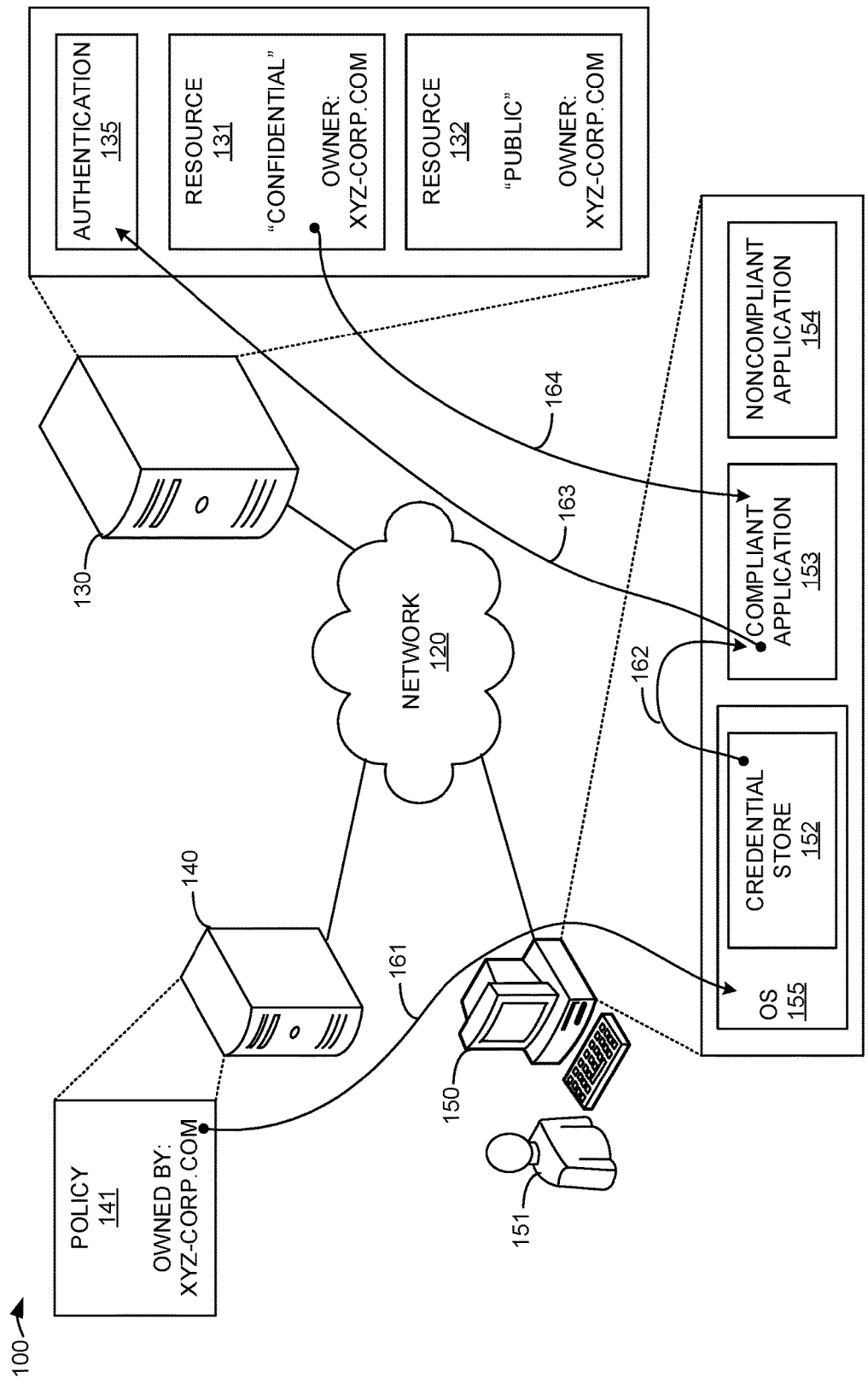

FIG. 1B helps illustrate an access by a compliant application. In FIG. 1B, operating system 155 of client device 150 receives policy 141 from policy server 140. This is illustrated by arrow 161. Policy 141 may specify that compliant application 153 is to be given access to resource 131 and resource 132. Likewise, policy 141 may specify that noncompliant application 154 is not to be given access to resource 131 and resource 132. Policy 141 may specify that noncompliant application 154 is not to be given access to resource 131 based on both the classification of resource 131 (i.e., "classified") and the associated owner of resource 131 (i.e., XYZ-Corp.com).

When compliant application 153 goes to access confidential resource 131 compliant application 153 receives a credential from credential store 152. This is illustrated by arrow 162. Using this credential, compliant application 153 is authenticated to authentication component 135. This is illustrated by arrow 163. Once authenticated, compliant application 153 is able to access confidential resource 131.

Figure 1C:
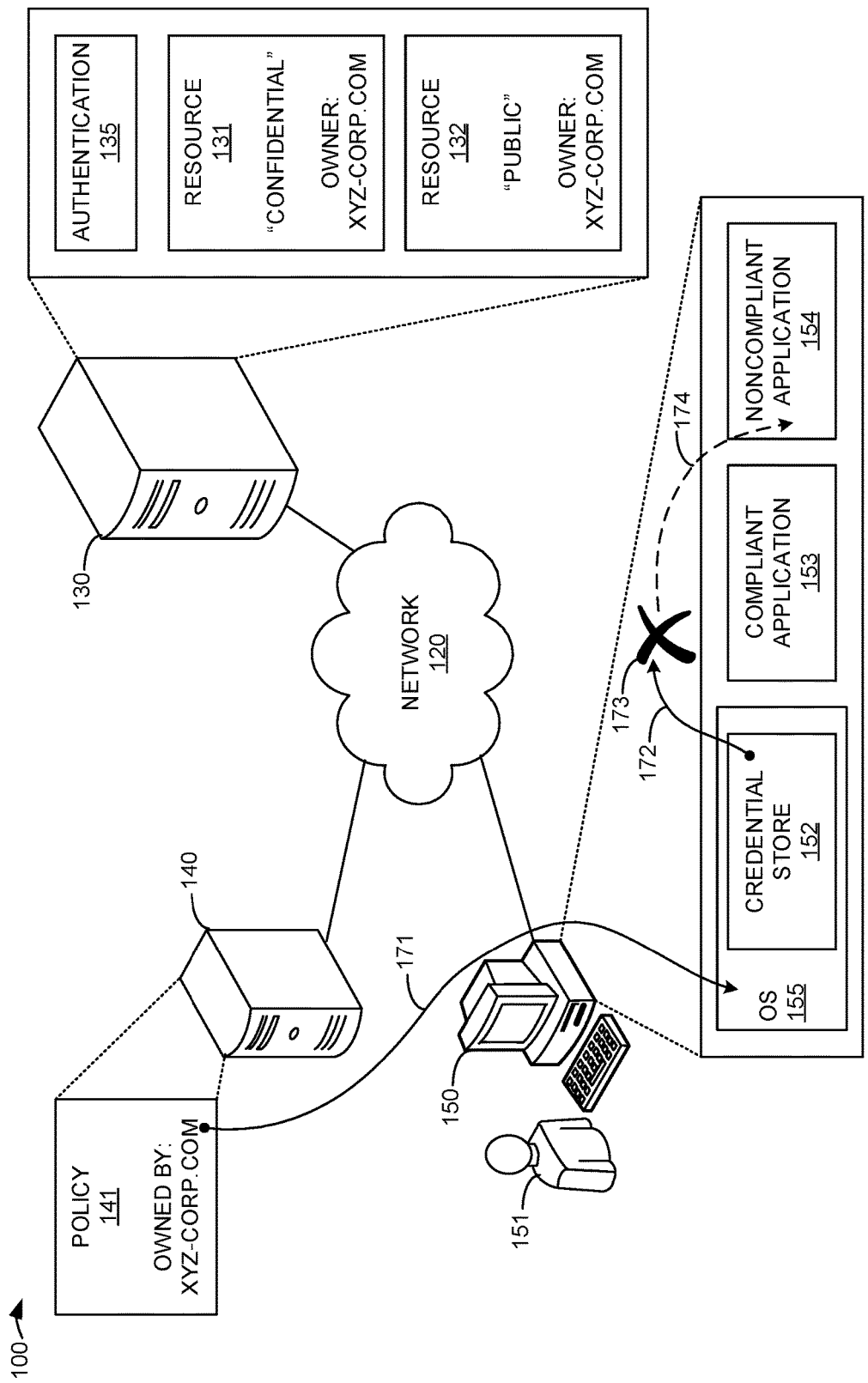

FIG. 1C helps illustrate an attempted access by a noncompliant application. In FIG. 1C, operating system 155 of client device 150 receives policy 141 from policy server 140. This is illustrated by arrow 171. Policy 141 may specify that noncompliant application 154 is not to be given access to resource 131. Policy 141 may specify that noncompliant application 154 is not to be given access to resource 131 based on the confidential classification associated with resource 131 and/or the associated owner of resource 131.

When noncompliant application 154 goes to access confidential resource 131, noncompliant application 154 is not to authenticated to authentication component 135. This is illustrated by arrow 172, "X" 173, and dashed arrow 174. Since noncompliant application 154 is not authenticated to authentication component 135, noncompliant application 154 is unable to access confidential resource 131. In an embodiment, in response to not being allowed access to resource 131, noncompliant application 154 and/or operating system 155 may cause the display of an "access denied" type message to user 151.

Figure 1D:
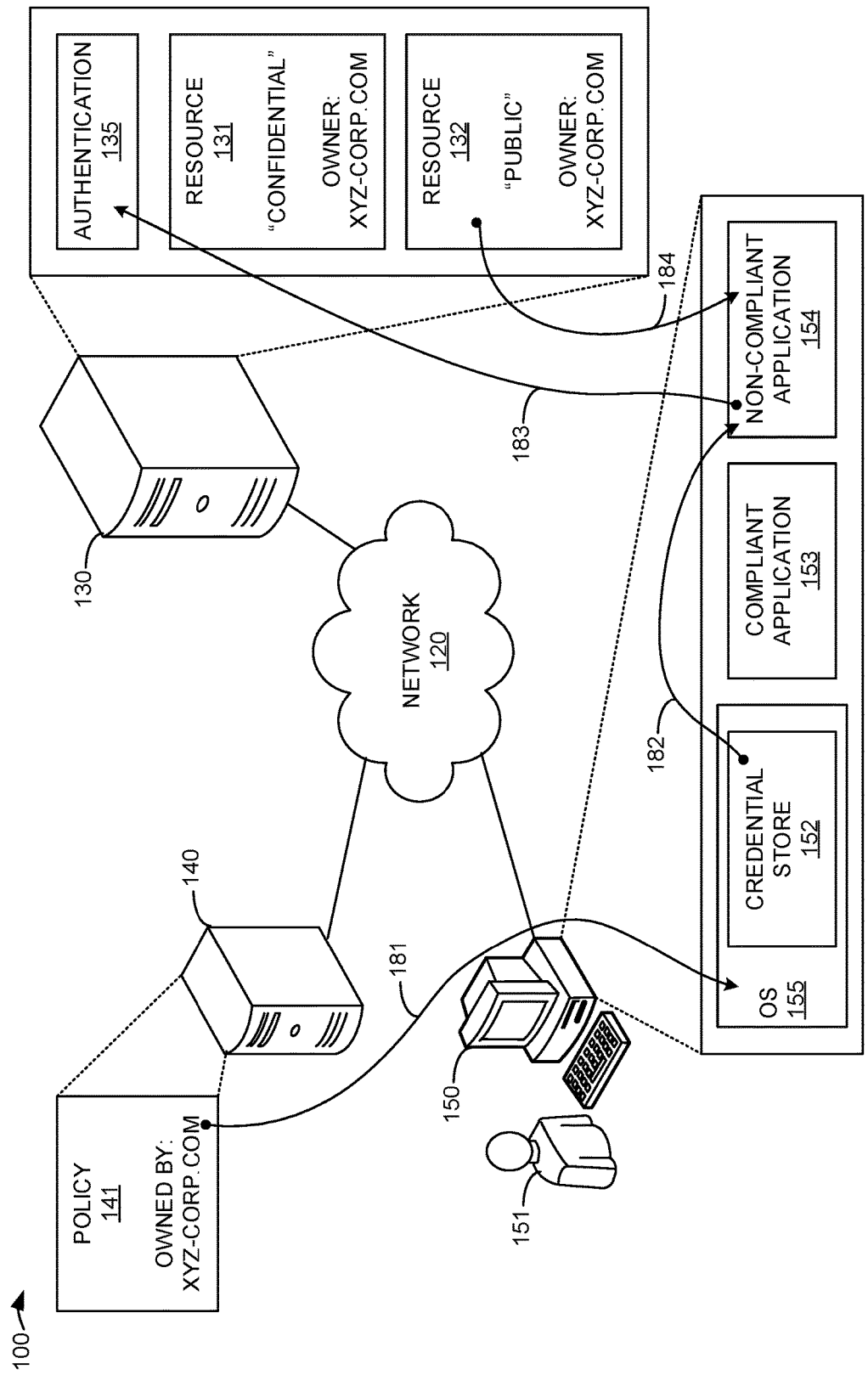

FIG. 1D helps illustrate a permitted access by a noncompliant application. In FIG. 1D, operating system 155 of client device 150 receives policy 141 from policy server 140. This is illustrated by arrow 181. Policy 141 may specify that noncompliant application 154 is to be given access to resources that have a "public" classification (e.g., resource 132), but not be given access to resources that have a "classified" classification (e.g., resource 131). Policy 141 may specify that noncompliant application 154 is to be given access to resource 132 based on both the classification of resource 131 (i.e., "public") and the associated owner of resource 132 (i.e., XYZ-Corp.com). Similarly, in an embodiment, policy 141 may specify a default whereby all network locations are considered as not being subject to a data protection policy unless otherwise indicated by policy 141. For example, policy 141 may specify network locations (e.g., ranges of IP addresses and/or domain names) that are to be subject to a data protection policy and all other IP addresses and/or domain names are not subject to the data protection policy.

When noncompliant application 154 goes to access public resource 132 noncompliant application 154 is allowed to use a credential from credential store 152. This is illustrated by arrow 182. Using this credential, noncompliant application 154 is able to be authenticated to authentication component 135. This is illustrated by arrow 183. Once authenticated, noncompliant application 154 is able to access resource 132.

In an embodiment, client device 150 (and OS 155, in particular) determines that data from a network resource 131 is subject to a data protection policy (e.g., policy 141.) This determination may be based on a classification, owner, or other metadata that is associated with network resource 131. For example, network resource 131 may be classified as "confidential." Network resource 131 may also be associated with the domain XYZ-Corp.com. Whether network resource 131 is subject to a data protection policy may be specified by policy 141. For example, policy 141 may specify that all data associated with a certain classification level (e.g., "classified", "private", etc.) is subject to the policies specified in policy 141. In another example, policy 141 may specify that all data associated with a certain domain (e.g., "XYZ-Corp.com", "192.168.X.X", etc.) is subject to the policies specified in policy 141.

Client device 150 may determine that a compliant application 153 implements the data protection policy. This determination may be in the form of an entry/indicator in policy 141 that specifies which applications comply with policy 141. Based at least in part on the determination that compliant application 153 implements the data protection policy, compliant application 153 is provided, by OS 155, use of the access credentials required to access network resource 131.

Client device 150 may also determine that noncompliant application 154 does not implement the data protection policy. This determination may be in the form of an entry/indicator in policy 141 that specifies which applications do not comply with policy 141. This determination may be in the form of the lack of an entry/indicator in policy 141 that specifies noncompliant application 154 as complying with policy 141. Based at least in part on the determination that noncompliant application 154 does not implement the data protection policy, OS 155 will not allow noncompliant application 154 to use the credentials required to access network resource 131. In an embodiment, the access credentials comprise a single sign-on token associated with network resource 131 and/or server 130. In an embodiment, the access credentials are associated with an identity credential.

In an embodiment, a network administrator or other user may create and maintain policy 141. A network administrator or other user may configure network resource 131 to indicate that network resource 131 is subject to the data protection policy (e.g., by associating network resource 131 with a particular designation.)

Client device 150 may determine that network resource 132 is not subject to a data protection policy. This determination may be in the form of an entry/indicator in policy 141 that specifies which applications do and/or do not comply with policy 141. Even though network resource 132 is not subject to a data protection policy, network resource 132 may still require access credentials to access network resource 132. Based at least in part on determining that network resource 132 is not subject to a data protection policy, noncompliant application 154 may be provided with the access credentials required to access network resource 132.

In an embodiment, determining that compliant application 153 implements the data protection policy can include receiving a message and/or indicator associated with the compliant application 153 from policy management server 140. This indicator or message may be associated with compliant application 153 implementing the data protection policy.

In an embodiment, client device 150 accesses one or more of network resource 131 and/or network resource 132 from server 130. Client device 150 includes a client component (e.g., OS 155) that is configured to receive and store access credentials in credential store 152. The client component is also configured to receive a data protection policy (e.g., policy 141) from a policy management service (e.g., policy server 140.) When requested by applications on client device 150, the client component is configured to provide or deny use of the access credential(s) to the respective applications.

A compliant application 153, which is stored or running on client device 150, is configured to use the access credentials to access network resource 131. Based on policy 141, compliant application 153 is to be provided use of the access credential for network resource 131. Noncompliant application 154, which is stored or running on client device 150, is also configured to use the access credentials to access network resource 131. However, based on the data protection policy, noncompliant application 154 is to be denied use of the access credential. In an embodiment, the access credential required to access network resource 131 (and/or network resource 132) comprises a user identification and associated password.

In an embodiment, an access credential used to access server 130 may allow access to network resource 131, which is associated with a first classification (e.g., 'classified'), and to access network resource 132, which is associated with a second classification (e.g., 'public). Policy 141 may be based on the first classification and the second classification. For example, policy 141 may specified that 'classified' resources cannot be shared outside of a particular home domain (e.g., XYZ-Corp.com), whereas 'public' resources can be shared anywhere. In an embodiment, compliant application 153 is provided the access credential based on the first classification and compliant application 153 is denied the access credential based on the second classification. For example, compliant application 153 may be provided access to a resource designated as 'internal use only' while noncompliant application 154 is denied access to a resource designated as 'confidential.'

In an embodiment, client device 150 includes operating system 155, compliant application 153, and noncompliant application 154. Operating system 155 is configured to receive data protection policy 141. Operating system 155 is also configured to store a first access credential to be used to access network resource 131 and a second access credential to be used to access a network resource 132. Compliant application 153 is configured to request operating system 155 to use the first access credential to allow compliant application 153 to access network resource 131. In response to this request, and based on policy 141, operating system 155 provides the compliant application 153 with access to network resource 131.

Noncompliant application 154 is configured to request operating system 155 to use the first access credential to allow noncompliant application 154 to access network resource 131. In response to this request, and based on policy 141, the operating system 155 denies the noncompliant application 154 use of the first access credential. This prevents noncompliant application 154 from accessing network resource 131.

Operating system 155 may be further configured to deny compliant application 153 access to network resource 132 based on the data protection policy. In other words, compliant application 153 may be designated as only 'partially' compliant. In this manner, network resources associated with certain (e.g., 'medium') levels of sensitivity may be accessed by compliant application 153 while network resources associated with other (e.g., 'Top Secret!') levels of sensitivity may be too sensitive to allow access by a 'partially' compliant application 153. Operating system may be further configured to provide noncompliant application 154 with access to network resource 132 resource based on the data protection policy.

In an embodiment, policy 141 includes an association between a first classification and compliant application 153 that corresponds to indicating compliant application 153 is allowed to access data with the first classification. Policy 141 may include an association between the first classification and noncompliant application 154 that corresponds to indicating noncompliant application 154 is not allowed to access data with the first classification.

Figure 2:
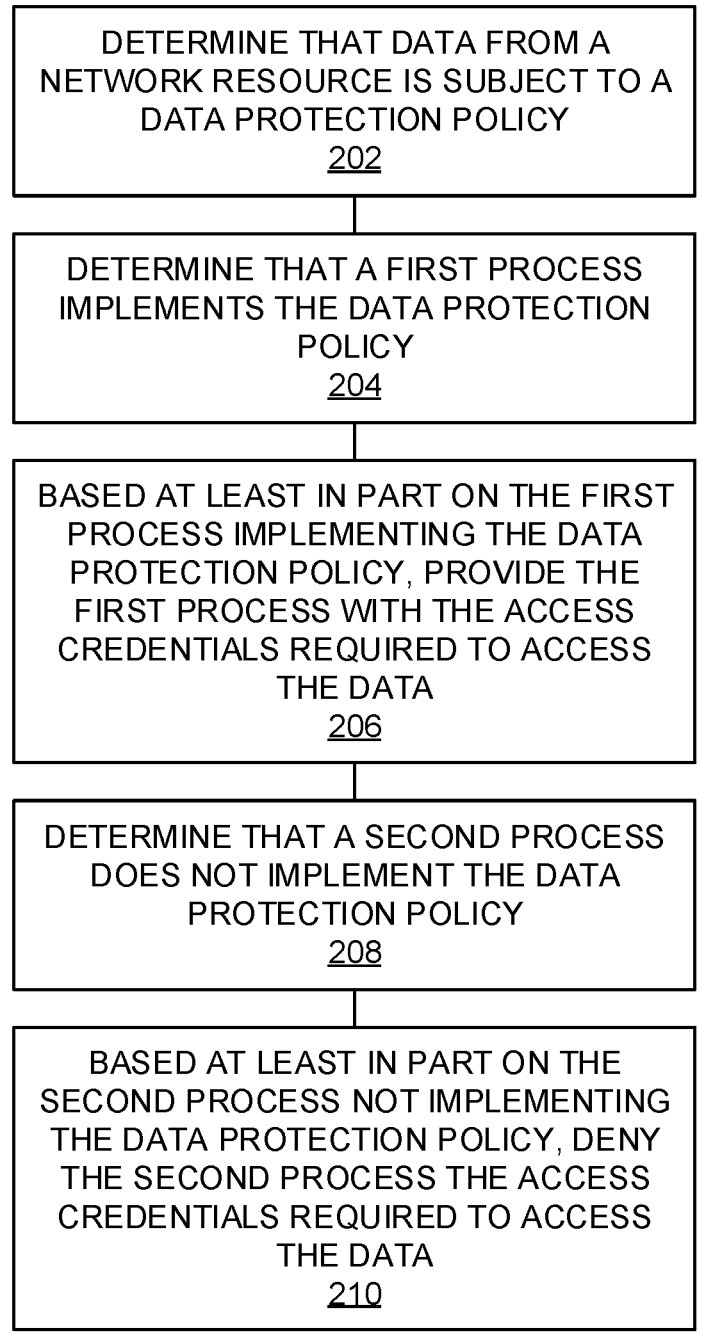
FIG. 2 is a flowchart illustrating a method of operating an access control system.

FIG. 2 is a flowchart illustrating a method of operating an access control system. The steps illustrated in FIG. 2 may be performed by one or more elements of access control system 100. It is determined that data from a network resource is subject to a data protection policy (202). For example, based on policy 141, the classification, owner, or other metadata associated with resource 131, operating system 155 may determine that resource 131 is subject to a data protection policy.

It is determined that a first process implements the data protection policy (204). For example, based on policy 141 operating system 155 may determine that compliant application 153 implements the data protection policy. In other words, policy 141 may include indicators and/or a list of applications that are compliant in implementing the data protection policies specified by policy 141.

Based at least in part on the first process implementing the data protection policy, the first process is provided with use of the access credentials required to access the data (206). For example, based on the determination that compliant application 153 implements the data protection policy 141, operating system 155 provides compliant application 153 with use of credentials from credential store 152. These credentials can be used to authenticate compliant application 153 to authentication component 135 and thereby allow compliant application 153 to access confidential resource 131.

It is determined that a second process does not implement the data protection policy (208). For example, based on policy 141 operating system 155 may determine that noncompliant application 154 does not implement the data protection policy. In other words, policy 141 may include indicators and/or a list of applications that are noncompliant in implementing the data protection policies specified by policy 141.

Based at least in part on the second process not implementing the data protection policy, the second process is denied use of the access credentials required to access the data (210). For example, based on the determination that noncompliant application 154 does not implement data protection policy 141, operating system 155 does not provide noncompliant application 154 with use of the credentials from credential store 152. Without these credentials, noncompliant application 154 is not able to be authenticated to authentication component 135 and thereby access confidential resource 131.

Figure 3:
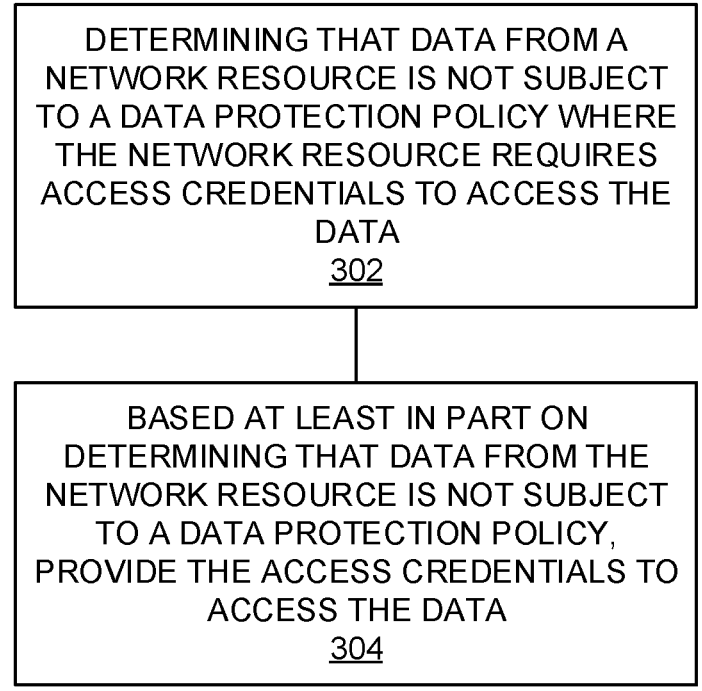
FIG. 3 is a flowchart illustrating an access to data not subject to a data protection policy.

FIG. 3 is a flowchart illustrating an access to data not subject to a data protection policy. The steps illustrated in FIG. 3 may be performed by one or more elements of access control system 100. It is determined that data from a network resource is not subject to a data protection policy, where the network resource requires access credentials to access the data. For example, based on policy 141 and the classification (i.e., "public") associated with resource 132 operating system 155 may determine that resource 132 is not subject to data protection policy 141.

Based at least in part on determining that the data from the network resource is not subject to a data protection policy, the access credentials to access the data are provided (304). For example, based on the determination that resource 132 is not subject to a data protection policy 141, operating system 155 may provide noncompliant application 154 and/or compliant application 153 with use of a credential from credential store 152.

Figure 4:
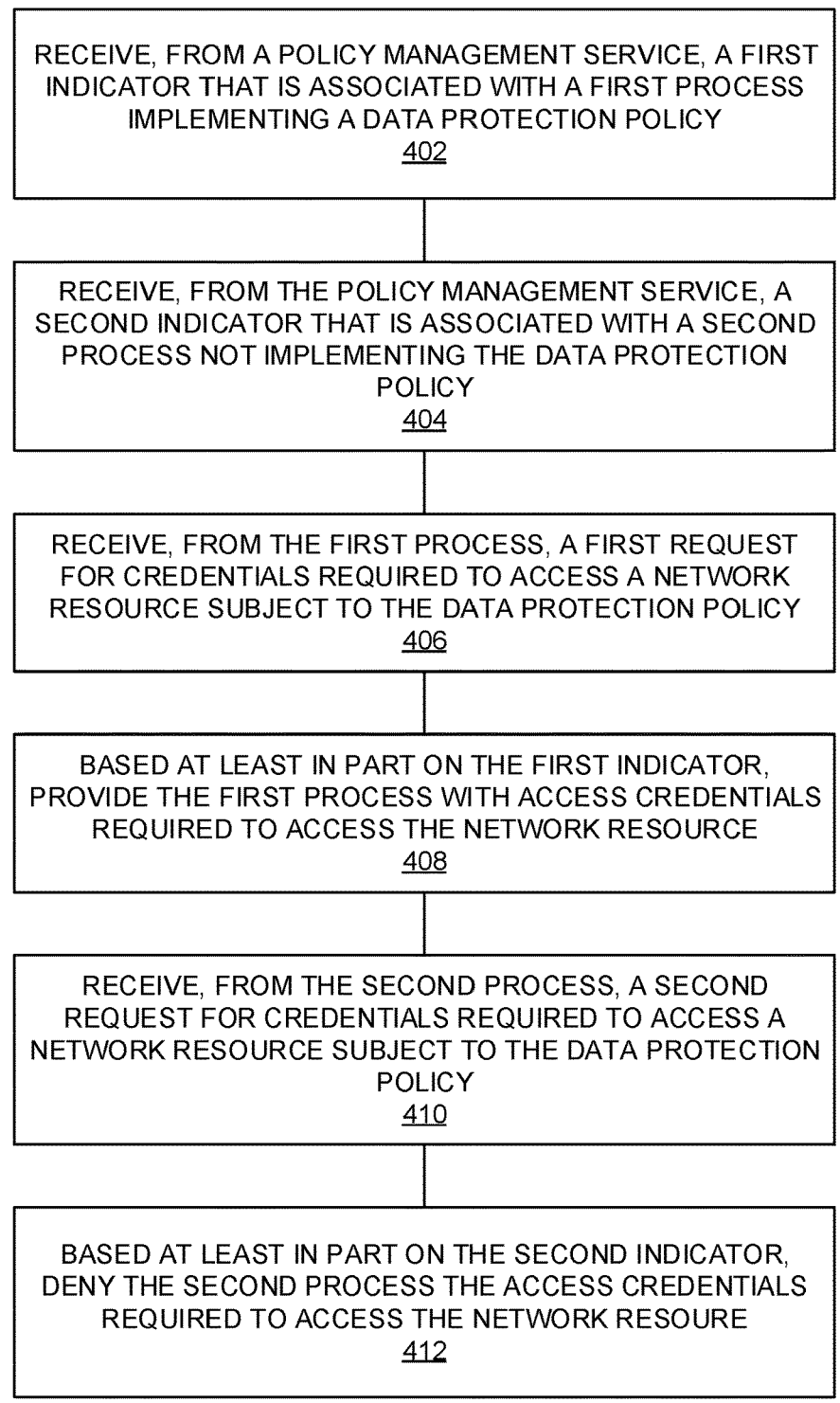
FIG. 4 is a flowchart illustrating a method of protecting data from leakage.

FIG. 4 is a flowchart illustrating a method of protecting data from leakage. The steps illustrated in FIG. 4 may be performed by one or more elements of access control system 100. From a policy management service, a first indicator is received that is associated with a first process implementing a data protection policy (402). For example, operating system 155 may receive, from policy management server 140, an indicator (e.g., as part of policy 141) that compliant application 153 implements data protection policy 141.

From a policy management service, a second indicator is received that is associated with a second process not implementing the data protection policy (404). For example, operating system 155 may receive, from policy management server 140, an indicator (e.g., as part of policy 141) that noncompliant application 154 is designated as not meeting the specifications for data protection required by data protection policy 141.

From the first process, a first request for credentials required to access a network resource subject to the data protection policy is received (406). For example, operating system 155 may receive, from compliant application 153, a request to access resource 131. Based at least in part on the first indicator, the first process is provided with access credentials required to access the network resource (408). For example, based on the indicator that compliant application 153 implements data protection policy 141, operating system 155 may provide compliant application 153 with use of a credential from credential store 152 that can be used to access resource 131.

From the second process, a second request for credentials required to access a network resource subject to the data protection policy is received (410). For example, operating system 155 may receive from noncompliant application 154 a request to access resource 131. Based at least in part on the second indicator, the second process is denied the access credentials required to access the network resource (412). For example, based on the indicator that noncompliant application 154 does not implement data protection policy 141, operating system 155 does not provide noncompliant application 154 with use of a credential from credential store 152 that can be used to access resource 131. In an embodiment, when noncompliant application 154 is denied a credential, operating system 155 and/or noncompliant application 154 may display an "access denied" type message.

Figure 5:
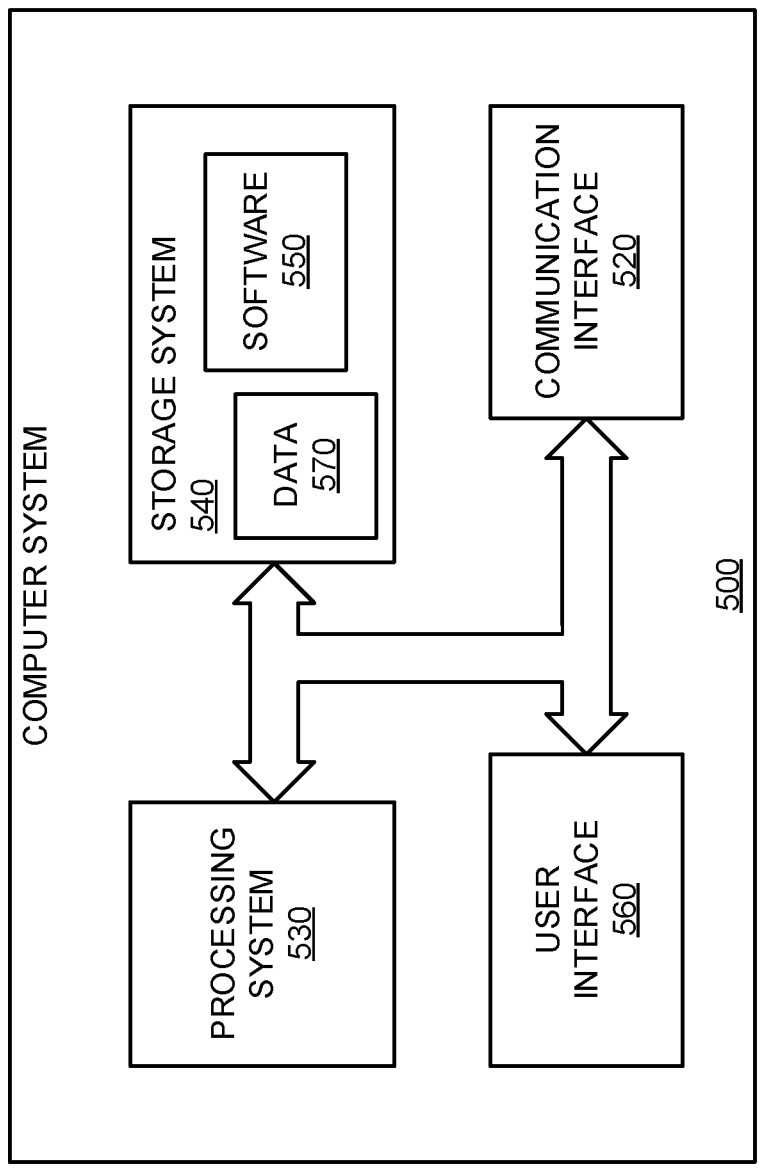
FIG. 5 is a block diagram of a computer system.

FIG. 5 is a block diagram illustrating a computer system. In an embodiment, computer system 500 and/or its components include circuits, software, and/or data that implement, or are used to implement, the methods, systems and/or devices illustrated in the Figures, the corresponding discussions of the Figures, and/or are otherwise taught herein. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of access control system 100, and its components. These software descriptions may be: behavioral, register transfer, logic component, transistor, and layout geometry-level descriptions.

Data formats in which such descriptions may be implemented are stored on a non-transitory computer readable medium include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Physical files may be implemented on non-transitory machine-readable media such as: 4 mm magnetic tape, 8 mm magnetic tape, 3½-inch floppy media, CDs, DVDs, hard disk drives, solid-state disk drives, solid-state memory, flash drives, and so on.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), multi-core processors, graphics processing units (GPUs), etc.

FIG. 5 illustrates a block diagram of an example computer system. Computer system 500 includes communication interface 520, processing system 530, storage system 540, and user interface 560. Processing system 530 is operatively coupled to storage system 540. Storage system 540 stores software 550 and data 570. Processing system 530 is operatively coupled to communication interface 520 and user interface 560. Computer system 500 may comprise a programmed general-purpose computer. Computer system 500 may include a microprocessor. Computer system 500 may comprise programmable or special purpose circuitry. Computer system 500 may be distributed among multiple devices, processors, storage, and/or interfaces that together comprise elements 520-570.

Communication interface 520 may comprise a network interface, modem, port, bus, link, transceiver, or other communication device. Communication interface 520 may be distributed among multiple communication devices. Processing system 530 may comprise a microprocessor, microcontroller, logic circuit, or other processing device. Processing system 530 may be distributed among multiple processing devices. User interface 560 may comprise a keyboard, mouse, voice recognition interface, microphone and speakers, graphical display, touch screen, or other type of user interface device. User interface 560 may be distributed among multiple interface devices. Storage system 540 may comprise a disk, tape, integrated circuit, RAM, ROM, EEPROM, flash memory, network storage, server, or other memory function. Storage system 540 may include computer readable medium. Storage system 540 may be distributed among multiple memory devices.

Processing system 530 retrieves and executes software 550 from storage system 540. Processing system 530 may retrieve and store data 570. Processing system 530 may also retrieve and store data via communication interface 520. Processing system 550 may create or modify software 550 or data 570 to achieve a tangible result. Processing system may control communication interface 520 or user interface 560 to achieve a tangible result. Processing system 530 may retrieve and execute remotely stored software via communication interface 520.

Software 550 and remotely stored software may comprise an operating system, utilities, drivers, networking software, and other software typically executed by a computer system. Software 550 may comprise an application program, applet, firmware, or other form of machine-readable processing instructions typically executed by a computer system. When executed by processing system 530, software 550 or remotely stored software may direct computer system 500 to operate as described herein.

Implementations discussed herein include, but are not limited to, the following examples:

Example 1

A method implemented in a computing device, comprising: determining that first data from a network resource is subject to a data protection policy, the network resource requiring access credentials to access the first data; determining that a first process implements the data protection policy; based at least in part on the first process implementing the data protection policy, providing the first process with the access credentials required to access the first data; determining that a second process does not implement the data protection policy; and, based at least in part on the second process not implementing the data protection policy, denying the second process the access credentials required to access the first data.

Example 2

The method of example 1, further comprising: configuring the network resource to indicate that the first data is subject to the data protection policy.

Example 3

The method of example 2, wherein the access credentials comprise a single sign-on token associated with the network resource.

Example 4

The method of example 1, further comprising: determining that second data from the network resource is not subject to a data protection policy, the network resource requiring access credentials to access the second data.

Example 5

The method of example 4, further comprising: based at least in part on determining that second data from network resource is not subject to a data protection policy, providing the second process the access credentials to access the second data.

Example 6

The method of example 1, wherein determining that the first process implements the data protection policy comprises: receiving a first indicator associated with the first process from a policy management service, the first indicator corresponding to the first process implementing the data protection policy.

Example 7

The method of example 1, wherein the access credentials are associated with an identity credential.

Example 8

A user device for accessing a resource from a service endpoint, comprising: a client component configured to receive an access credential and to receive a data protection policy from a policy management service, the client component also configured to provide the access credential to applications requesting access to a resource; a first application configured to use the access credential to access the resource, the first application to, based on the data protection policy, be provided the access credential; and, a second application configured to use the access credential to access the resource, the second application to, based on the data protection policy, be denied the access credential.

Example 9

The user device of example 8, wherein the access credential comprises a user identification and associated password required to access the resource.

Example 10

The user device of example 8, wherein the resource includes access to first data that has a first classification and second data that has a second classification.

Example 11

The user device of example 10, wherein the data protection policy is based on the first classification and the second classification.

Example 12

The user device of example 10, wherein the first application is provided the access credential based on the first classification.

Example 13

The user device of example 10, wherein the second application is denied the access credential based on the second classification.

Example 14

A computing device, comprising: an operating system configured to receive a data protection policy and to store a first access credential to be used to access a first network resource and a second access credential to be used to access a second network resource; a first application configured to request the operating system to use the first access credential to allow the first application access to the first network resource, the operating system to provide the first application with access to the first network resource based on the data protection policy; and, a second application configured to request the operating system to use the first access credential to allow the second application access to the first network resource, the operating system to, based on the data protection policy, deny the second application access to the first access credential in order to deny the second application access to the first network resource.

Example 15

The computing device of example 14, wherein the operating system is further configured to deny the first application access to the second network resource based on the data protection policy.

Example 16

The computing device of example 15, wherein the operating system is further configured to provide the second application with access to the second network resource based on the data protection policy.

Example 17

The computing device of example 14, wherein the first network resource is associated with a first data classification and the second network resource is associated with a second data classification.

Example 18

The computing device of example 17, wherein the data protection policy is based on the first classification and the second classification.

Example 19

The computing device of example 18, wherein the data protection policy includes an association between the first classification and the first application that corresponds to indicating the first application is allowed to access data with the first classification.

Example 20

The computing device of example 18, wherein the data protection policy includes an association between the first classification and the second application that corresponds to indicating the second application is not allowed to access data with the first classification.

The foregoing descriptions of the disclosed embodiments have been presented for purposes of illustration and description. They are not intended to be exhaustive or to limit the scope of the claimed subject matter to the precise form(s) disclosed, and other modifications and variations may be possible in light of the above teachings. The embodiments were chosen and described in order to best explain the principles of the disclosed embodiments and their practical application to thereby enable others skilled in the art to best utilize the various embodiments and various modifications as are suited to the particular use contemplated. It is intended that the appended claims be construed to include other alternative embodiments except insofar as limited by the prior art.

What is claimed is:

1. A computer implemented method of reducing or preventing data leakage which would otherwise occur from applications running at a client operating system (OS) and which do not operate in accordance with restrictions imposed by a data protection policy for confidential resources stored at a network resource server, wherein the computer-implemented method is performed by one or more processors when executing computer-executable instructions for the computer-implemented method, which comprises:

storing at the network resource server first data or resources that are designated as confidential, and second data or resources that are designated as public;

storing at a policy server the data protection policy that determines the restrictions imposed by the data protection policy as to how one or more applications running at the client OS are to be restricted in terms of how the first data or resources are used or where the first data or resources are located or accessed;

distributing the data protection policy from the policy server to the one or more client OS of one or more client systems, and wherein each client OS of the one or more client OS that receives the data protection policy has a credential store in which access credentials are stored that are required for authentication by the network resource server before granting access to an application running at a client OS of a given client of the one or more client systems to the first data or resources;

determining at the client OS of the given client that a first application running at the client OS of the given client complies with the restrictions imposed by the data protection policy and that the first application is a compliant application;

providing the compliant application with the access credentials stored at the credential store of the client OS of the given client required by the compliant application to access the first data or resources at the network resource server;

determining at the client OS of the given client that a second application running at the client OS of the given client does not comply with the restrictions imposed by the data protection policy and that the second application is a noncompliant application; and denying the access credentials stored at the credential store of the client OS of the given client required by the noncompliant application to access the first data or resources at the network resource server.

2. The computer-implemented method of claim 1, further comprising configuring the network resource server to indicate that the first data or resources are subject to the data protection policy.

3. The computer-implemented method of claim 2, wherein the access credentials stored at the credential store of the client OS of the given client comprise a single sign-on token associated with the network resource server.

4. The computer-implemented method of claim 1, wherein the second data or resources designated as public are not subject to the restrictions imposed by the data protection policy, but wherein the second data or resources designated as public still require particular access credentials in order to access the second data or resources at the network resource server.

5. The computer-implemented method of claim 4, wherein, based at least in part on determining that the second data or resources are not subject to the restrictions imposed by the data protection policy but that the second data or resources still require authentication by an application when accessing the second data or resources, providing the second application running at the client OS of the given client with the particular access credentials in order to permit the second application running at the client OS of the given client to access the second data or resources designated as public, but not the first data or resources designated as confidential.

6. The computer-implemented method of claim 1, wherein the data protection policy specifies which applications are compliant, and wherein applications not specified as compliant are designated by the data protection policy as noncompliant by default.

7. The computer-implemented method of claim 3, wherein the access credentials stored at the credential store of the client OS of the given client are also associated with an identity credential such that both the single sign-on token and the identity credential are presented by an application being authenticated at the network resource server.

8. A computer system comprising a memory containing computer-executable instructions, and one or more processors which, when executing the computer-executable instructions, configure the computer system with an architecture for a classification and access control system that reduces or prevents data leakage which would otherwise occur from applications running at a client operating system (OS) and which do not operate in accordance with restrictions imposed by a data protection policy for confidential resources stored at a network resource server, and wherein the architecture for the classification and access control system comprises:
  a network resource server that stores first data or resources that are designated as confidential, and second data or resources that are designated as public;
  a policy server that stores the data protection policy that determines the restrictions imposed by the data protection policy as to how one or more applications running at the client OS are to be restricted in terms of how the first data or resources are used or where the first data or resources are located or accessed;
  one or more client systems comprising one or more client OS to which the data protection policy from the policy server is distributed, and wherein each client OS of the one or more client OS that receives the data protection policy has a credential store in which access credentials are stored that are required for authentication by the network resource server before granting access to an application running at a client OS of a given client of the one or more client systems to the first data or resources;
  wherein the client OS of the given client determines that a first application running at the client OS of the given client complies with the restrictions imposed by the data protection policy and that the first application is a compliant application, and then provides the compliant application with the access credentials stored at the credential store of the client OS of the given client required by the compliant application to access the first data or resources at the network resource server; and
  wherein the client OS of the given client determines that a second application running at the client OS of the given client does not comply with the restrictions imposed by the data protection policy and that the second application is a noncompliant application, and then denies the access credentials stored at the credential store of the client OS of the given client required by the noncompliant application to access the first data or resources at the network resource server.

9. The computer system of claim 8, wherein the architecture for the classification and access control system further operates to configure the network resource server to indicate that the first data or resources are subject to the data protection policy.

10. The computer system of claim 9, wherein the access credentials stored at the credential store of the client OS of the given client comprise a single sign-on token associated with the network resource server.

11. The computer system of claim 10, wherein the access credentials stored at the credential store of the client OS of the given client are also associated with an identity credential such that both the single sign-on token and the identity credential are presented by an application being authenticated at the network resource server.

12. The computer system of claim 8, wherein the second data or resources designated as public are not subject to the restrictions imposed by the data protection policy, but wherein the second data or resources designated as public still require particular access credentials in order to access the second data or resources at the network resource server.

13. The computer system of claim 12, wherein, based at least in part on a determination that the second data or resources at the network resource server are not subject to the restrictions imposed by the data protection policy but that the second data or resources still require authentication by an application when accessing the second data or resources, the architecture of the computer system causes the client OS of the given client to provide the second application running at the client OS of the given client with the particular access credentials in order to permit the second application running at the client OS of the given client to access the second data or resources designated as public, but not the first data or resources designated as confidential.

14. The computer system of claim 8, wherein the data protection policy specifies which applications are compliant, and wherein applications not specified as compliant are designated by the data protection policy as noncompliant by default.

15. A computer system for providing a classification and access control system that reduces or prevents data leakage which would otherwise occur from applications running at a client operating system (OS) and which do not operate in accordance with restrictions imposed by a data protection policy for confidential resources stored at a network resource server, the computer system comprising:
  a memory;
  a network resource server that stores:
  first data or resources that are designated as confidential;
  second data or resources that are designated as public; and
  authentication credentials required to access at least the first data or resources designated as confidential;
  a policy server that stores the data protection policy that determines the restrictions imposed by the data protection policy as to how one or more applications running at the client OS are to be restricted in terms of how the first data or resources are used or where the first data or resources are located or accessed, and wherein the data protection policy specifies applications that are compliant, and wherein applications not specified as compliant are designated by the data protection policy as noncompliant by default;
  one or more client systems comprising one or more client OS to which the data protection policy from the policy server is distributed, and wherein each client OS of the one or more client OS that receives the data protection policy has a credential store in which access credentials are stored that correspond to the authentication credentials required at the network resource server to access at least the first data or resources designated as confidential before granting access to an application running at a client OS of a given client of the one or more client systems to the first data or resources;

wherein the client OS of the given client determines that a first application running at the client OS of the given client complies with the restrictions imposed by the data protection policy and that the first application is thus specified as a compliant application, and then provides the compliant application with the access credentials stored at the credential store of the client OS of the given client required by the compliant application to access the first data or resources at the network resource server; and wherein the client OS of the given client also determines that a second application running at the client OS of the given client is not specified as compliant and by default the second application is a noncompliant application, and then denies the access credentials stored at the credential store of the client OS of the given client required by the noncompliant application to access the first data or resources at the network resource server.

16. The computer system of claim 15, wherein the access credentials stored at the credential store of the client OS of the given client comprise a single sign-on token associated with the network resource server.

17. The computer system of claim 16, wherein the access credentials stored at the credential store of the client OS of the given client are also associated with an identity credential such that both the single sign-on token and the identity credential are presented by an application being authenticated at the network resource server.

18. The computer system of claim 15, wherein the second data or resources designated as public are not subject to the restrictions imposed by the data protection policy, but wherein the second data or resources designated as public still require particular access credentials in order to access the second data or resources at the network resource server.

19. The computer system of claim 18, wherein, based at least in part on a determination that the second data or resources at the network resource server are not subject to the restrictions imposed by the data protection policy but that the second data or resources still require authentication by an application when accessing the second data or resources, the client OS of the given client provides the second application running at the client OS of the given client with the particular access credentials in order to permit the second application running at the client OS of the given client to access the second data or resources designated as public, but not the first data or resources designated as confidential.

* * * * *